United States Patent Office 2,711,158
Patented June 21, 1955

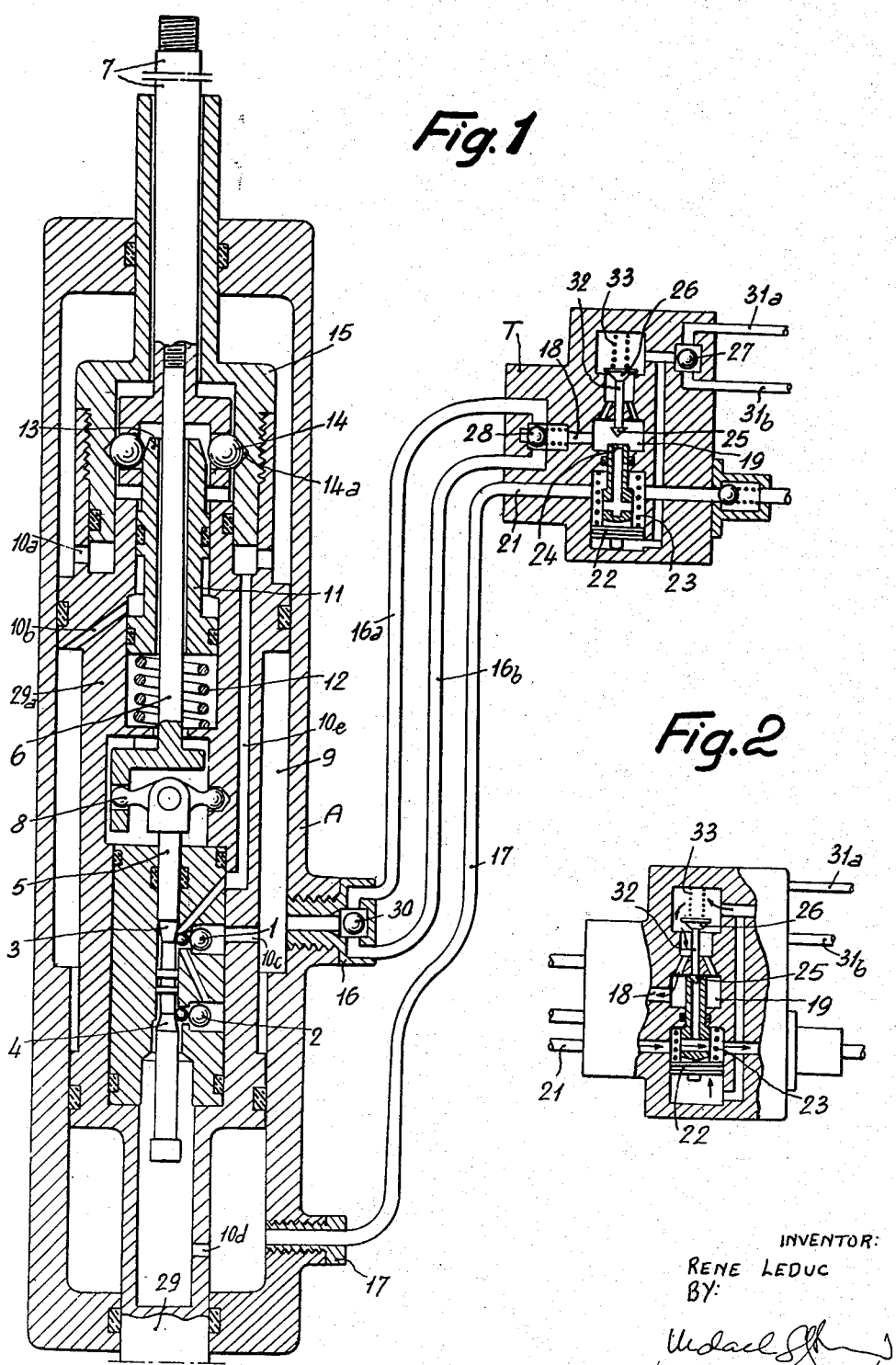

2,711,158

CONTROL APPARATUS AND LOCKING MEANS THEREFOR

Rene Leduc, Toulouse, France

Original application October 9, 1951, Serial No. 250,453. Divided and this application July 14, 1954, Serial No. 443,387

Claims priority, application France February 28, 1947

9 Claims. (Cl. 121—41)

The present invention relates to a control apparatus for interconnecting a controlling member with a controlled member.

More particularly, the present invention relates to a control apparatus adapted to be operated by fluid pressure and to a means for locking a controlling member to a controlled member when the fluid pressure falls below a predetermined limit, so that the device will not become inoperative in this latter event.

The present application is a division of application Serial No. 250,453, filed October 9, 1951, which is a continuation-in-part of application Serial No. 10,060, filed February 21, 1948, now Patent No. 2,574,335, dated November 6, 1951.

One of the objects of the present invention is to provide a control apparatus of the above type which is of an exceedingly simple and efficient construction and permits the controlled member to be actuated with a minimum of force applied to the controlling member.

Another object of the present invention is to feed back a portion of the fluid pressure to the controlling member to give the operator an indication of the resistance encountered in the actuation of the control apparatus.

A further object of the present invention is to provide a means for rendering the device operative even after the fluid pressure falls below a predetermined limit required for normal operation.

An additional object of the present invention is to provide a means for short-circuiting the flow of fluid in the apparatus when the fluid pressure falls below a predetermined limit so as to nullify the effect of fluid pressure in the latter event.

With the above objects in view, the present invention mainly consists of a piston adapted to be connected to a controlled member and located within a cylinder so that the piston and cylinder are mounted for movement with respect to each other. A supply conduit means supplies fluid to one side of the piston, and a discharge conduit means discharges fluid from an opposite side of the piston. A first ball valve means is mounted in the piston to control the flow of fluid between the opposite sides thereof, and a second ball valve means is mounted in the dischage conduit means to control the flow of fluid from the opposite side of the piston. An actuating member engages the first and second ball valve means and is mounted for reciprocating movement so as to open one of said ball valve means upon movement in one direction and the other of said ball valve means upon movement in an opposite direction. This actuating member is adapted to be connected to a controlling member so that the actuating member is moved upon movement of the controlling member. Thus, when the first ball valve means is open fluid will flow from one side of the piston to said opposite side thereof so as to move the piston in one direction in the cylinder, and, when the second ball valve means is open, fluid will flow from the opposite side of the piston so that fluid pressure will move the piston in an opposite direction in the cylinder. This movement of the piston causes corresponding movements in the member to be controlled. Locking means, responsive to the fluid pressure, is located between the piston and controlling member for interconnecting the same when the fluid pressure falls below a predetermined limit, and a short circuit means, also responsive to the fluid pressure, is located between the supply and discharge conduit means for interconnecting the latter when the fluid pressure falls below the predetermined limit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows a longitudinal, partially sectional, schematic view of one possible apparatus for carrying out the present invention; and Fig. 2 shows a part of the structure of Fig. 1 in a different position thereof.

Referring now to the drawings, there is shown a cylinder A having opposite end walls and having a first interior portion, adjacent to the lower end wall as viewed in Fig. 1, which is of a smaller diameter than a second interior cylinder portion extending from the first interior portion to the upper cylinder end wall shown in Fig. 1. Mounted in the cylinder A for sliding movement therein is the piston means 15 which has a pair of opposite end extensions respectively extending slidably through the opposite end walls of the cylinder A. These end extensions of the piston means 15 are bored, the upper end extension, as viewed in Fig. 1, having an open end and the lower end extension 29 having a closed end. These opposite end extensions are of the same diameter, and the piston means 15 has a first portion, adjacent the upper end extension, which is of a larger diameter than this latter end extension and of a smaller diameter than the second interior portion of the cylinder A, a second annular portion next to the first portion and slidably engaging the interior wall of the second portion of cylinder A, a third portion of a smaller diameter than the first interior portion of cylinder A and extending from the second annular portion of the piston into the first interior portion of the cylinder, and a fourth annular portion next to the third portion, and slidably engaging the first interior portion of the cylinder. The piston means 15 is provided with an interior chamber extending between the bores of the end extensions. The piston means 15 is formed with a first bore 10a, a second bore 10b, a third bore 10c and a fourth bore 10d. The bore 10a communicates with a passage 10e located outside of the chamber extending through the piston means 15, this passage communicating with a ball valve means 1 which in turn communicates with the bore 10c so that the ball valve means 1 controls the flow of fluid between passage 10e and bore 10c. A second ball valve 2 communicates through a bore of piston means 15 with ball valve means 1, and with the bore 10d through the bore of extension 29.

The piston means 15 has a member mounted therein for supporting the ball valve means 1 and 2 and for slidably supporting the elongated actuating member 5 for movement in piston means 15, this actuating member 5 having a pair of oppositely inclined conical surface portions 3 and 4 which respectively engage the ball valve means 1 and 2 so as to open the ball valve means 2 when the member 5 is moved upwardly, as viewed in Fig. 1, and so as to open the ball valve means 1 when the member 5 is moved downwardly, as viewed in Fig. 1. The member 5 is formed with a central piston portion located between the inclined surface portions 3 and 4 for sealing off these inclined surface portions from each other, this central piston portion of member 5 slidably engaging the member in which actuating member 5 is mounted.

A lever 8 is pivotally connected at an intermediate part thereof with the upper end of member 5, as viewed in Fig. 1, one end of the lever 8 pivotally engaging a recess in the interior chamber of piston means 15, as shown in Fig. 1, and the other end of the lever 8 engaging the lower end of the angular portion of the elongated member 6 which extends through a bore in a floor of the chamber in piston means 15 and is threadedly connected at its upper end to the controlling member 7 of the control apparatus, this member 7 having a cage, on the lower end thereof, located adjacent to the groove 14a formed in the wall of the chamber of the piston means 15. A plurality of ball members 14 are mounted in apertures of the cage of controlling member 7 and are located adjacent to the groove 14.

An elongated sleeve member 11 is located about the member 6 and has an upper conical end portion 13 located adjacent to the ball members 14 to maintain the same in the apertures of the cage of member 7, this elongated sleeve member 11 having a pair of spaced annular portions slidably engaging the interior wall of the chamber in piston means 15 and being located respectively on opposite sides of the bore 10b. A coil spring 12 is located about the member 6 and abuts with one end thereof against the apertured floor of the interior chamber of piston means 15 and with the other end thereof against the sleeve member 11. It will be noted from Fig. 1 that the member 7 is mounted with clearance in the upper extension of piston means 15 and that the sleeve member 11 is mounted with clearance about the member 6 so that in this way the members 8, 6, 12 and 7 are subject to atmospheric pressure while being located within the piston means 15 that is surrounded with fluid, as will be described below.

A supply conduit means 16 is connected to the cylinder A for supplying fluid under pressure to the space 9 between piston means 15 and cylinder A, this fluid flowing through the bore 10b to the space between the pair of annular portions of sleeve member 11 so as to act against spring 12 and compress the same. In this way the fluid pressure lowers the conical end 13 of sleeve 11 with respect to the ball members 14 so that the latter are not urged into the annular groove 14a, and in this way the members 6 and 7 are free to move with respect to the piston means 15 so as to move member 5 and actuate the ball valve members 1 or 2. When the ball valve means 1 is open, the fluid flows through the bore 10c, through the ball valve means 1, through the passage 10e, and through the bore 10a to surround the upper part of piston means 15, as viewed in Fig. 1.

A discharge conduit means 17 is connected to the first interior portion of cylinder A opposite the extension 29 of piston means 15 for discharging fluid surrounding the extension 29 and passing through the bore 10d from the valve means 2, when the latter is open. Ball valve means 1 is so constructed that fluid may flow around the smaller ball member thereof even when ball valve means 1 is in its closed position, so that the passage 10e is always in communication with ball valve means 2 as well as ball valve means 1.

The conduit means 16 comprises the separate lines 16a and 16b which have the ball member 30 located between the same at one end thereof and ball member 28 located between the same at the opposite end thereof, this ball member 28 being maintained between the lines 16a and 16b by a coil spring, as shown in Fig. 1. The purpose of this coil spring will be described more fully below. The lines 16a and 16b communicate with the bore 18 of the short circuiting device T, this bore 18 leading to chamber 19 in which the valve member 32 is mounted for sliding movement and is urged downwardly, as viewed in Fig. 1, by the spring 33 bearing against the end 26 of valve 32 so that the conical end 25 of valve member 32 is urged by spring 33 toward the valve seat 24 formed on the upper end of member 22 which is longitudinally and transversely bored and formed as a piston adjacent the lower end thereof, as viewed in Fig. 1. Spring 23 engages the member 22 to urge the same downwardly, as viewed in Fig. 1, and discharge conduit means 17 communicates with bore 21 leading across the space about the member 22. The lines 16a and 16b are supplied by the lines 31a and 31b which have the ball member 27 located therebetween. The device T is shown in a short circuiting position in Fig. 1 and in its normal position of operation in Fig. 2.

The ball members 27, 28 and 30 are safety devices, the ball members 28 and 30 serving to automatically close off one of the lines 16a or 16b when the pressure fails therein, due to a leak for example, so that the other of the lines will continue to function by itself. The purpose of the spring bearing against ball member 28 is to prevent it from blocking the passage 18. The ball member 27 and another ball member (not shown) function in the same way with respect to lines 31a and 31b as the ball members 28 and 30 function with respect to lines 16a and 16b.

The above described apparatus operates as follows:

When the fluid pressure in the device is above a predetermined value, which value may be set by proper choice of springs 23 and 12, the pressure in the fluid will act on the piston part of member 23 to raise the same, as shown in Fig. 2, so that the seat 24 engages the conical end 25 of member 32 and raises the latter against the action of spring 33, as shown in Fig. 2. The supply and discharge conduit means 16 and 17 are then separated from each other so that the fluid flows from lines 31a and 31b to the bore 18 and conduit means 16 to enter the cylinder A and from the cylinder A through the discharge conduit means 17 and bored member 22 to a collecting tank for example, from where the fluid is again pumped to the lines 31a and 31b so as to maintain the fluid in the device at the above mentioned predetermined pressure.

Assuming that, during the normal operation of the device, it is desired to move extension 29 downwardly, as viewed in Fig. 1, in order to impart a corresponding movement to an element to be controlled, then the controlling member 7 is moved downwardly, as viewed in Fig. 1, so as to pivot the lever 8 in a counter-clockwise direction, as viewed in Fig. 1, about the right hand end of lever 8, as viewed in Fig. 1, to impart a corresponding downward movement to the member 5. The lever 8 is preferably designed so as to impart to the membr 5 one-half of the movement of member 7. Upon downward movement of the member 5, the inclined surface portion 3 will bear against the smaller ball member of ball valve means 1 so as to thereby move the large ball member thereof away from its seat so that the ball valve means 1 is then in its open position and ball valve means 2 remains closed. Since ball valve means 2 is closed, fluid cannot flow to the discharge conduit means 17, and the fluid can therefore only flow through the ball valve means 1, passage 10e and bore 10a to the area around the upper part of piston means 15. Since the effective area of this upper part of piston means 15 is much greater than the effective piston area in space 9, the fluid pressure will lower the piston means 15 with respect to the cylinder A and thereby impart a downward movement to extension 29 when the member 7 is moved downwardly, as viewed in Fig. 1, the fluid then flowing as described above. It will be noted that the movement of member 7 is in no way resisted by the fluid pressure and is entirely independent thereof so that the device is easy to operate.

As was mentioned above, during the normal operation of the apparatus, fluid pressure of space 9 communicates through bore 10b with the sleeve member 11 to urge the same against the action of spring 12 and maintain the latter in compressed condition, the space in which this spring 12 is located being open to the atmosphere.

If it is desired to move the extension 29 in an upward direction, as viewed in Fig. 1, in order to impart a corresponding movement to a controlled element connected to extension 29, the member 7 is moved upwardly with respect to the piston means 15 to impart a corresponding upward movement to member 5 and thereby open valve means 2 while maintaining valve means 1 in its closed position. When the valve means 2 is open, it places the fluid around the upper part of piston means 15 in communication with the discharge conduit means 17 by way of the bore 10a, passage 10e, the space around the smaller ball member of valve means 1, the open valve means 2, the bore of extension 29, and the bore of 10d. The pressure in the discharge conduit means 17 is negligible as compared to the pressure in the supply conduit means 16 and space 9 so that this latter pressure acting against the lower face of the above-mentioned second annular portion of piston means 15 moves piston means 15 upwardly with respect to cylinder A, as viewed in Fig. 1, and forces the fluid from the upper part of the piston means 15 out through the discharge conduit means 17 by the above-mentioned path. In this way, when the controlling element 7 is moved upwardly, as viewed in Fig. 1, a corresponding movement is imparted to extension 29 and a controlled element connected thereto. Of course, it is obvious that when the movement of member 7 in either of its directions has been terminated, the fluid pressure automatically will move the piston means 15 with respect to the member 7 until the equilibrium position where both valve means 1 and 2 are closed is again obtained.

Assuming now that for some reason, such as for example a leak in the lines, the fluid pressure falls below the above-mentioned predetermined limit, then the spring 23 will move the member 22 from the position shown in Fig. 2 to the position shown in Fig. 1 so that the supply and discharge conduit means 16 and 17 are short-circuited. Also, due to the fall in pressure, the spring 12 will move the sleeve member 11 upwardly, as viewed in Fig. 1, so that the conical end portion 13 thereof urges the ball members 14 into the annular groove 14a and maintains the ball members 14 in this position so that the member 7 is mechanically connected to the piston means 15 when the fluid pressure falls below this predetermined limit. There is thus automatically formed a mechanical linkage between the controlling and controlled element when the fluid pressure falls below a predetermined limit, and the entire device is still operative although it no longer operates by fluid pressure. This features is of extremely great merit when one considers for example a control device mounted in an aeroplane which would be rendered difficult to operate upon the failure in the fluid lines. By the above-mentioned structure the pilot of an aeroplane, for example, may still effectively control the same even when the fluid pressure falls below a predetermined limit. Without such an automatic locking device, there would be extremely great play in the valve members, because these are designed to open to a relatively large extent to permit maneuvering of the areoplane during normal operations thereof, and this great play in the valve members would render the control of the areoplane very difficult. This latter disadvantage is entirely eliminated by the above-described locking apparatus.

When the fluid pressure is below the predetermined pressure limit and member 7 is locked to piston means 15, as described above, the fluid pressure does not urge the valve members 1 and 2 into either their closed or open positions and they may be easily moved into or from either position. Assuming, with the parts in this position, that it is desired to move extension 29 downwardly, as viewed in Fig. 1, then the member 7 is moved downwardly to move the entire piston means 15 and extension 29 downwardly therewith. During such movement the third portion of piston means 15 moves further into the first interior portion of cylinder A so that the volume of space 9 is decreased and fluid is forced from space 9 through conduit means 16, through bore 18, member 22, bore 21 and conduit means 17 into the lower part of cylinder A. The fluid entering the lower part of cylinder A flows through the bore 10d, opens the valve means 2 and flows to the upper part of piston means 15. The valve means 1 and 2 do not in any way resist the flow of fluid at this time.

If it is desired to move extension 29 upwardly, with the fluid pressure below the predetermined pressure limit and element 7 locked to position means 15, element 7 is simply moved upwardly to carry piston means 15 and extension 29 along therewith, the fluid flowing from the upper part of piston means 15, through bore 10a, passage 10e and valve means 1 to the conduit means 16 through the short circuit device T, and through the conduit means 17 to the lower part of cylinder A.

Thus, when the fluid pressure falls below the above-mentioned predetermined limit, the flow of fluid in the conduit means 16 and 17 is just the reverse of that prevailing during normal operation. As soon as the normal pressure is again restored to the fluid, it will raise the member 22 to the position shown in Fig. 2 and compress the spring 12 to automatically unlock member 7 from piston means 15 and the device will again operate normally in the manner described above.

It will be understood that each of the elements described above, or two or more together, may also find a useful application in other types of control apparatus and locking means therefore differing from the types described above.

While the invention has been illustrated and described as embodied in a control apparatus and means for mechanically locking the same when fluid pressure therein falls below a predetermined limit, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a control apparatus, in combination, a cylinder; a piston movably mounted in said cylinder, being formed with an internal chamber and with an annular groove in said chamber, and having one side having a first effective area and an opposite side having a second effective area greater than said first effective area; supply conduit means leading to said cylinder for supplying fluid to said one side of said piston; discharge conduit means leading from said cylinders for discharging fluid from said opposite side of said piston; first and second ball valve means respectively located in said piston and discharge conduit means for respectively controlling the flow of fluid therethrough; elongated rod means being mounted for movement along its length, said rod means engaging said first and second ball valve means for moving only said first valve means into an open position upon movement of said rod means in one direction and for moving only said second valve means into an open position upon movement of said rod means in an opposite direction, whereby, when said first valve means is open, fluid flows from said one side of said piston to said opposite side thereof to move said piston in one direction in said cylinder, and whereby, when said second valve means is open, fluid discharges from said opposite side of said piston so that fluid pressure moves the same in an opposite direction in said cylinder; control means operatively connected to said rod means for actuating the latter; and locking means interconnecting said control means and piston for locking said control means to said piston when the fluid pressure in said cylinder falls below a predetermined limit, said locking means comprising a cage fixedly mounted on said control means and being located adjacent to said annular groove, a plurality of ball members supported by said cage for movement into and out of said annular groove upon movement of said control means, an elongated actuating member movably mounted in said chamber and having a conical end portion extending into said cage and engaging said ball members, and spring means mounted in said chamber and abutting against an end of said elongated actuating member opposite to said conical end portion thereof to urge the latter into said cage.

2. In a control apparatus, in combination, a cylinder; a piston movably mounted in said cylinder, being formed with an internal chamber having a floor and with an annular groove in said chamber, and having one side having a first effective area and an opposite side having a second effective area greater than said first effective area, said piston also being formed with a bore interconnecting said one side of said piston with said chamber; supply conduit means leading to said cylinder for supplying fluid to said one side of said piston; discharge conduit means leading from said cylinder for discharging fluid from said opposite side of said piston; first and second ball valve means respectively located in said piston and discharge conduit means for respectively controlling the flow of fluid therethrough; elongated rod means being mounted for movement along its length, said rod means engaging said first and second ball valve means for moving only said first valve means into an open position upon movement of said rod means in one direction and for moving only said second valve means into an open position upon movement of said rod means in an opposite direction, whereby, when said first valve means is open, fluid flows from said one side of said piston to said opposite side thereof to move said piston in one direction in said cylinder, and whereby, when said second valve means is open, fluid discharges from said opposite side of said piston so that fluid pressure moves the same in an opposite direction in said cylinder; control means operatively connected to said rod means for actuating the latter; locking means interconnecting said control means and piston for locking said control means to said piston when the fluid pressure in said cylinder falls below a predetermined limit, said locking means comprising a cage fixedly mounted on said control means and being located adjacent to said annular groove, a plurality of ball members supported by said cage for movement into and out of said annular groove upon movement of said control means, an elongated actuating member movably mounted in said chamber and having a conical end portion extending into said cage and engaging said ball members, a second piston formed on an end of said elongated actuating member opposite to conical end portion thereof and engaging a wall portion of said chamber, said second piston being located between said floor of said chamber and said bore, and spring means mounted in said chamber and abutting against said second piston and said chamber floor, said spring means being compressed by fluid pressure above said predetermined limit so that, when the fluid pressure falls below said predetermined limit, said spring means moves said conical end portion of said elongated actuating member into said cage so as to lock said ball members in said annular groove and thereby lock said control means to said piston so that the latter may be moved along with said control means when the fluid pressure falls below said predetermined value.

3. In a control apparatus, in combination, a cylinder; a piston movably mounted in said cylinder, being formed with an internal chamber having a floor and with an annular groove in said chamber, and having one side having a first effective area and an opposite side having a second effective area greater than said first effective area, said piston also being formed with a bore interconnecting said one side of said piston with said chamber; supply conduit means leading to said cylinder for supplying fluid to said one side of said piston; discharge conduit means leading from said cylinder for discharging fluid from said opposite side of said piston; first and second ball valve means respectively located in said piston and discharge conduit means for respectively controlling the flow of fluid therethrough; elongated rod means being mounted for movement along its length, said rod means engaging said first and second ball valve means for moving only said first valve means into an open position upon movement of said rod means in one direction and for moving only said second valve means into an open position upon movement of said rod means in an opposite direction, whereby, when said first valve means is open, fluid flows from said one side of said piston to said opposite side thereof to move said piston in one direction in said cylinder, and whereby, when said second valve means is open, fluid discharges from said opposite side of said piston so that fluid pressure moves the same in an opposite direction in said cylinder; control means operatively connected to said rod means for actuating the latter; locking means interconnecting said control means and piston for locking said control means to said piston when the fluid pressure in said cylinder falls below a predetermined limit, said locking means comprising a cage fixedly mounted on said control means and being located adjacent to said annular groove, a plurality of ball members supported by said cage for movement into and out of said annular groove upon movement of said control means, an elongated actuating member movably mounted in said chamber and having a conical end portion extending into said cage and engaging said ball members, a second piston formed on an end of said elongated actuating member opposite to conical end portion thereof and engaging a wall portion of said chamber, said second piston being located between said floor of said chamber and said bore, and spring means mounted in said chamber and abutting against said second piston and said chamber floor, said spring means being compressed by fluid pressure above said predetermined limit so that, when the fluid pressure falls below said predetermined limit, said spring means moves said conical end portion of said elongated actuating member into said cage so as to lock said ball members in said annular groove and thereby lock said control means to said piston so that the latter may be moved along with said control means when the fluid pressure falls below said predetermined value; and short-circuit means interconnecting said supply and discharge conduit means for short-circuiting the flow of fluid between the same when fluid pressure falls below said predetermined limit.

4. In a control apparatus, in combination, a cylinder; a piston movably mounted in said cylinder, being formed with an internal chamber having a floor and with an annular groove in said chamber, and having one side having a first effective area and an opposite side having a seocnd effective area greater than said first effective area, said piston also being formed with a bore interconnecting said one side of said piston with said chamber; supply conduit means leading to said cylinder for supplying fluid to said one side of said piston; discharge conduit means leading from said cylinder for discharging fluid from said opposite side of said piston; first and second ball valve means respectively located in said piston and discharge conduit means for respectively controlling the flow of fluid therethrough; elongated rod means being mounted for movement along its length, said rod means engaging said first and second ball valve means for moving only said first valve means into an open position upon movement of said rod means in one direction and for moving only said second valve means into an open position upon movement of said rod means in an opposite direction, whereby, when said first valve means is open, fluid flows from said one side of said piston to said opposite side thereof to move said piston in one direction in said cylinder, and whereby, when said second valve means is open, fluid discharges from said opposite side of said piston so that fluid pressure moves the same in an opposite direction in said cylinder; control means operatively connected to said rod means for actuating the latter, said control means comprising a shaft extending through said chamber; and locking means interconnecting said control means and piston for locking said control means to said piston when the fluid pressure in said cylinder falls below a predetermined limit, said locking means comprising a cage fixedly mounted on said control means and being located adjacent to said annular groove, a plurality of ball members supported by said cage for movement into and out of said annular groove upon movement of said control means, an elongated, tubular actuating member movably mounted in said chamber, being located about said shaft member, and having a conical end portion extending into said cage and engaging said ball members, a second piston formed on an end of said elongated actuating member opposite to conical end portion thereof and engaging a wall portion of said chamber, said second piston being located between said floor of said chamber and said bore, and a coil spring mounted in said chamber, being located about said shaft member, and abutting against said second piston and said chamber floor, said spring being compressed by fluid pressure above said predetermined limit so that, when the fluid pressure falls below said predetermined limit, said spring moves said conical end portion of said elongated actuating member into said cage so as to lock said ball members in said annular groove and thereby lock said control means to said piston so that the latter may be moved along with said control means when the fluid pressure falls below said predetermined value.

5. In a control apparatus, in combination, a cylinder; a piston movably mounted in said cylinder, being formed with an internal chamber having a floor and with an annular groove in said chamber, and having one side having a first effective area and an opposite side having a second effective area greater than said first effective area, said piston also being formed with a bore interconnecting said one side of said piston with said chamber; supply conduit means leading to said cylinder for supplying fluid to said one side of said piston; discharge conduit means leading from said cylinder for discharging fluid from said opposite side of said piston; first and second ball valve means respectively located in said piston and discharge conduit means for respectively controlling the flow of fluid therethrough; elongated rod means being mounted for movement along its length, said rod means engaging said first and second ball valve means for moving only said first valve means into an open position upon movement of said rod means in one direction and for moving only said second valve means into an open position upon movement of said rod means in an opposite direction, whereby, when said first valve means is open, fluid flows from said one side of said piston to said opposite side thereof to move said piston in one direction in said cylinder, and whereby, when said second valve means is open, fluid discharges from said opposite side of said piston so that fluid pressure moves the same in an opposite direction in said cylinder; control means operatively connected to said rod means for actuating the latter, said control means comprising a shaft extending through said chamber; locking means interconnecting said control means and piston for locking said control means to said piston when the fluid pressure in said cylinder falls below a predetermined limit, said locking means comprising a cage fixedly mounted on said control means and being located adjacent to said annular groove, a plurality of ball members supported by said cage for movement into and out of said annular groove upon movement of said control means, an elongated, tubular actuating member movably mounted in said chamber, being located about said shaft member, and having a conical end portion extending into said cage and engaging said ball members, a second piston formed on an end of said elongated actuating member opposite to conical end portion thereof and engaging a wall portion of said chamber, said second piston being located between said floor of said chamber and said bore, and a coil spring mounted in said chamber, being located about said shaft member, and abutting against said second piston and said chamber floor, said spring being compressed by fluid pressure above said predetermined limit so that, when the fluid pressure falls below said predetermined limit, said spring moves said conical end portion of said elongated actuating member into said cage so as to lock said ball members in said annular groove and thereby lock said control means to said piston so that the latter may be moved along with said control means when the fluid pressure falls below said predetermined value; and short-circuit means interconnecting said supply and discharge conduit means for short-circuiting the flow of fluid between the same when fluid pressure falls below said predetermined limit.

6. A control apparatus, comprising in combination, an elongated cylinder having opposite end walls and having a first interior portion located adjacent one of said end walls and being of a smaller diameter than a second interior portion of said cylinder extending from first interior portion to the other of said end walls of said cylinder; a piston having a pair of opposite bored end extensions of the same diameter, a first portion adjacent one of said end extensions being of a larger diameter than said one extension and of a smaller diameter than said second interior portion of said cylinder, a second annular portion adjacent to said first portion, of a larger diameter than same and slidably engaging said second interior portion of said cylinder, a third portion next to said second portion, of a smaller diameter than said first interior portion of said cylinder and extending from said second interior portion of said cylinder into said first interior portion thereof, and a fourth annular portion located between the other of said end extensions of said piston and said third portion thereof and slidably engaging said first interior portion of said cylinder, said one end extension of said piston having an open end and extending slidably through said other end wall of said cylinder and said other end extension of said piston having a closed end and extending slidably through said one end wall of said cylinder, said piston being formed with an interior chamber extending between and communicating with said bored end extensions thereof, and said piston being formed with an annular groove located in said chamber adjacent said one end extension and with a passage extending along the exterior of said chamber, said piston being formed with a first bore located between said other end wall of said cylinder and said second portion of said piston and communicating with said passage, with a second bore located in said second portion of said piston on the side thereof adjacent to said third portion of said piston and communicating with said chamber, a third bore located in said third portion of said piston and communicating with said chamber, and a fourth bore communicating with said other bored end extension of said piston; first ball valve means located in said piston between said third bore and said passage of said piston to control the flow of fluid between same; second ball valve means located in said piston between said other bored end extension and said first ball valve means to control the flow of fluid between the same; an elongated actuating member mounted for sliding movement in said chamber and having a pair of oppositely inclined surface portions respectively engaging said first and second ball valve means to actuate one of said ball valve means upon movement of said actuating member in one direction along its length and to actuate the other of said ball valve means upon movement of said actuating member in an opposite direction; elongated control means extending through said one bored end extension of said piston and being of a smaller diameter than the same, said control means being operatively connected to said actuating member for moving the latter when said control means is moved in said piston, said control means comprising an annular cage located adjacent to said annular groove of said chamber; a plurality of ball members located in said cage adjacent to said annular groove; an elongated sleeve member located about said control means and having a pair of spaced annular portions slidably engaging the interior of said chamber and being respectively located on opposite sides of said second bore, one end of said sleeve member being conical and extending into said cage to a position opposite said ball members for urging the latter toward said annular groove; spring means operatively connected to said sleeve member for urging said conical end thereto into said cage member; supply conduit means connected to said cylinder opposite said third portion of said piston for supplying fluid to said cylinder, whereby said fluid may flow through said first ball valve means, when the latter is open, through said passage and into the space between said second portion of said piston and said one end wall of said cylinder, and whereby fluid may flow from the space between said third portion of said piston and cylinder through said second bore of said piston to said space between said pair of annular portions of said sleeve member in said chamber to act against said spring means when the fluid pressure is above a predetermined limit and prevent said conical end of said sleeve member from locating said ball members in said annular groove; and discharge conduit means connected to said cylinder adjacent said one end wall thereof opposite said other end extension of said piston for receiving fluid from said fourth bore of said piston when said second ball valve means is opened by said actuating member.

7. A control apparatus, comprising in combination, an elongated cylinder having opposite end walls and having a first interior portion located adjacent one of said end walls and being of a smaller diameter than a second interior portion of said cylinder extending from first interior portion to the other of said end walls of said cylinder; a piston having a pair of opposite bored end extensions of the same diameter, a first portion adjacent one of said end extensions being of a larger diameter than said one extension and of a smaller diameter than said second interior portion of said cylinder, a second annular portion adjacent to said first portion, of a larger diameter than same and slidably engaging said second interior portion of said cylinder, a third portion next to said second portion, of a smaller diameter than said first interior portion of said cylinder and extending from said second interior portion of said cylinder into said first interior portion thereof, and a fourth annular portion located between the other of said end extensions of said piston and said third portion thereof and slidably engaging said first interior portion of said cylinder, said one end extension of said piston having an open end and extending slidably through said other end wall of said cylinder and other end extension of said piston having a closed end and extending slidably through said one end wall of said cylinder, said piston being formed with an interior chamber extending between and communicating with said bored end extensions thereof, and said piston being formed with an annular groove located in said chamber adjacent the exterior of said chamber, said piston being formed said one end extension and with a passage extending along with a first bore located between said other end wall of said cylinder and said second portion of said piston and communicating with said passage, with a second bore located in said second portion of said piston on the side thereof adjacent to said third portion of said piston and communicating with said chamber, a third bore located in said third portion of said piston and communicating with said chamber, and a fourth bore communicating with said other bored end extension of said piston; first ball valve means located in said piston between said third bore and said passage of said piston to control the flow of fluid between same; second ball valve means located in said piston between said other bored end extension and said first ball valve means to control the flow of fluid between the same; an elongated actuating member mounted for sliding movement in said chamber and having a pair of oppositely inclined surface portions respectively engaging said first and second ball valve means to actuate one of said ball valve means upon movement of said actuating member in one direction along its length and to actuate the other of said ball valve means upon movement of said actuating member in an opposite direction; elongated control means extending through said one bored end extension of said piston and being of a smaller diameter than the same, said control means being operatively connected to said actuating member for moving the latter when said control means is moved in said piston, said control means comprising an annular cage located adjacent to said annular groove of said chamber; a plurality of ball members located in said cage adjacent to said annular groove; an elongated sleeve member located about said control means and having a pair of spaced annular portions slidably engaging the interior of said chamber and being respectively located on opposite sides of said second bore, one end of said sleeve member being conical and extending into said cage to a position opposite said ball members for urging the latter toward said annular groove; spring means operatively connected to said sleeve member for urging said conical end thereto into said cage member; supply conduit means connected to said cylinder opposite said third portion of said piston for supplying fluid to said cylinder, whereby said fluid may flow through said first ball valve means, when the latter is open, through said passage and into the space between said second portion of said piston and said one end wall of said cylinder, and whereby fluid may flow from the space between said third portion of said piston and cylinder through said second bore of said piston to said space between said pair of annular portions of said sleeve member in said chamber to act against said spring means when the fluid pressure is above a predetermined limit and prevent said conical end of said sleeve member from locating said ball members in said annular groove; discharge conduit means connected to said cylinder adjacent said one end wall thereof opposite said other end extension of said piston for receiving fluid from said fourth bore of said piston when said second ball valve means is opened by said actuating member; and short-circuit means operatively connected to said supply and discharge conduit means for interconnecting the latter when fluid pressure falls below said predetermined limit.

8. In a control apparatus, in combination, a cylinder; a piston movably mounted in said cylinder, being formed with an internal chamber and with an annular groove in said chamber, and having one side having a first effective area and an opposite side having a second effective area greater than said first effective area; supply conduit means leading to said cylinder for supplying fluid to said one side of said piston; discharge conduit means leading from said cylinder for discharging fluid from said opposite side of said piston; first and second conduit means respectively located in said piston and leading to the internal chamber of such piston; elongated rod means being mounted for movement along its length, said rod means carrying distribution means engaging the outlets of said conduit means in the internal chamber of said piston for opening only said first conduit means upon movement of said rod means in one direction and for opening only said second conduit means upon movement of said rod means in an opposite direction, whereby, when said first conduit means is open, fluid flows from said one side of said piston to said opposite side thereof to move said piston in one direction in said cylinder, and whereby, when said second conduit means is open, fluid discharges from said opposite side of said piston so that fluid pressure moves the same in an opposite direction in said cylinder; control means operatively connected to said rod means for actuating the latter; and locking means interconnecting said control means and piston for locking said control means to said piston when the fluid pressure in said cylinder falls below a predetermined limit, said locking means comprising a cage fixedly mounted on said control means and being located adjacent to said annular groove, a plurality of ball members supported by said cage for movement into and out of said annular groove upon movement of said control means, an elongated actuating member movably mounted in said chamber and having a conical end portion extending into said cage and engaging said ball members, and spring means mounted in said chamber and abutting against an end of said elongated actuating member opposite to said conical end portion thereof to urge the latter into said cage; and short-circuit means interconnecting said supply and discharge conduit means for short-circuiting the flow of fluid between the same when fluid pressure falls below a predetermined limit.

9. In a hydraulic control apparatus, in combination, a cylinder; a piston slidably mounted in said cylinder and being formed with an elongated chamber coaxial with said cylinder, with an annular groove in said chamber, and with a bore extending from said chamber to the interior of said cylinder so as to provide communication between said cylinder and said chamber; fluid guiding means operatively connected to said cylinder and piston for guiding fluid to and from at least one side of said piston so as to move the latter in said cylinder; control means for controlling the flow of fluid through said fluid guiding means, said control means including a movable rod means extending through an end wall of said cylinder and through said chamber of said piston; cage means connected to said rod means for movement therewith and being located opposite said annular groove; a plurality of ball members mounted on said cage means for free movement into and out of said groove; a sleeve member located in said chamber about said rod means, having a conical end portion located adjacent said ball members, and having a pair of annular projections slidably engaging the wall of said chamber and being located on opposite sides of said bore so that fluid in said cylinder will flow through said bore to the space between said annular projections, one of said annular projections being located at a greater distance from said ball members than the other of said annular projections and being of a larger diameter than said other annular projection so that fluid located between said annular projections will press against said one annular projection to move said sleeve member away from said ball members; and spring means located in said chamber and engaging said sleeve member to urge the latter toward said ball members, whereby when the fluid pressure in said cylinder is not great enough to overcome the action of said spring means, the latter will move said sleeve member toward said ball members to cause said conical end portion of said sleeve member to engage said ball members to move the latter into said annular groove for mechanically and automatically locking said rod means to said piston so that the latter will then move together with said rod means.

References Cited in the file of this patent

UNITED STATES PATENTS

| 635,104 | Lunken | Oct. 17, 1899 |
| 2,445,343 | Tyra | July 20, 1948 |

FOREIGN PATENTS

| 344,037 | Great Britain | Mar. 2, 1931 |
| 598,087 | Great Britain | Feb. 10, 1948 |